Sept. 12, 1961      W. B. LOWMAN      2,999,520
CIGARETTE ROD CUTTER AND CIGARETTE COUNTER
Filed Jan. 3, 1958
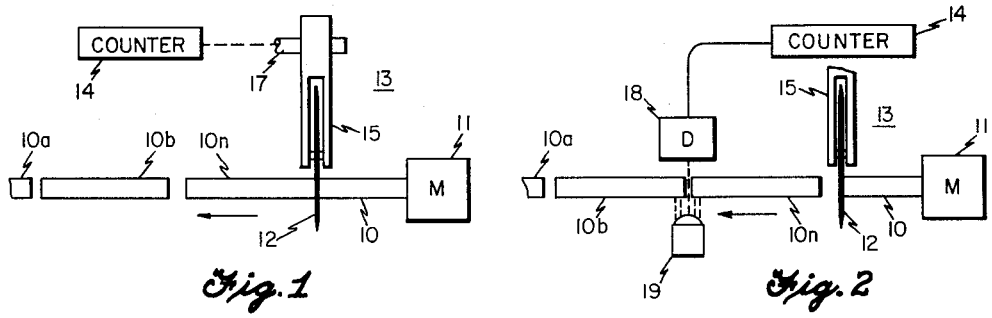
*Fig. 1*      *Fig. 2*
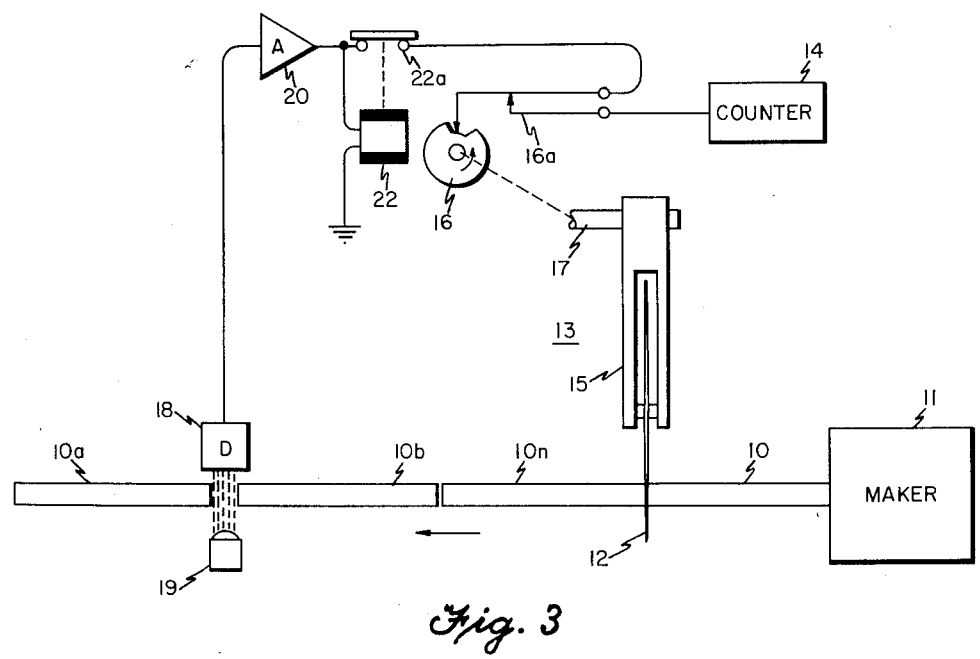
*Fig. 3*
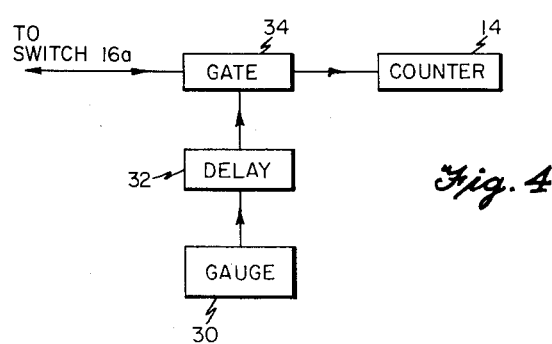
*Fig. 4*
INVENTOR
Walker B. Lowman

United States Patent Office 2,999,520
Patented Sept. 12, 1961

2,999,520
CIGARETTE ROD CUTTER AND CIGARETTE COUNTER
Walker B. Lowman, Columbus, Ohio, assignor to Industrial Nucleonics Corporation, a corporation of Ohio
Filed Jan. 3, 1958, Ser. No. 707,035
2 Claims. (Cl. 146—101)

This invention relates generally to an automatic and continuous production counter and specifically to method and means of quantitatively or qualitatively counting the pieces as actually being produced from continuous production process or machine.

There are known systems for counting a machine output that produces pieces from a continuous sheet, web or rod. The most common of these comprises measuring in one manner or another the speed of various moving shafts that advance the pieces at some point on the producing machine. The obvious disadvantage of this system is that the shafts may continue to move when no pieces are being produced, as would happen in a material break. Another known system is to have the produced pieces themselves actuate a counter such as by rotating a wheel whose revolutions are counted. This method is not entirely satisfactory since pieces of odd size may slip by without turning the wheel or friction in the wheel bearing may cause the wheel to turn more slowly than the surface speed of the passing pieces. Again another method commonly known is to count the space between pieces with a photocell; however, a distinct void between pieces is often hard to provide, and if temporarily not present, causes an error in the count.

The present invention provides a method and means of accurately counting the production pieces and eliminates the disadvantages of the above-mentioned systems. There is provided in a typical embodiment a counter coupled to a movable element whose speed is proportional to the rate at which pieces are produced and which counter is responsive only when pieces are actually being produced.

Accordingly, it is a general object of the present invention to provide a reliable method and means of qualitatively or quantitatively counting production pieces.

Another object of the present invention is to provide method and means of counting production pieces only as the pieces are actually being produced.

Another object of the present invention is to provide an accurate count of produced pieces only when they are produced at an acceptable production rate.

It is a further object of the invention to count production pieces only when all factors involving acceptable production are satisfactorily arranged.

Still another object of the present invention is to provide a production counter readily adaptable to present day continuous process systems, that is inexpensive and simple in design.

Other and further objects of the present invention will become apparent from the following detailed description when taken in conjunction with the drawings in which:

FIG. 1 is an illustration of one method to count product pieces.

FIG. 2 shows a commonly used alternative method of counting product pieces.

FIG. 3 is a partly schematic and partly diagrammatic representation of a typical embodiment of the present invention.

FIG. 4 is an illustration of a further modification of the embodiment shown in FIG. 3.

Referring now particularly to FIG. 1 there is shown a counter 14 rotatively coupled to a cutting device shown generally by the reference numeral 13. The cutter comprises a thin knife-edged disc 12 mounted on a cutting arm 15 which rotates about an axle 17. Rotating knife 12 is well known in cigarette making apparatus and may be of the type having a shaft that rotates at a speed to cause the blade of the knife to reciprocate at a rate of once per revolution, thereby cutting off one cigarette per revolution. A production device such as a cigarette maker 11 delivers a continuous rod 10 in the direction indicated by the arrow to the cutter 13 which severs the rod 10 into pieces 10a, 10b and 10n.

As the cutting arm 15 rotates in a plane perpendicular to the drawing surface and in the direction of the moving rod 10 it will sever another piece from rod 10, the counter 14 registers the fact that the cutter arm has completed another revolution about its axle 17. Since it is likely that the axle 17 will revolve regardless of the presence of the product 10, the possibility for a miscount of produced pieces is quite great.

A further improvement over this apparatus is shown in FIG. 2. Here a light source 19 actuates a photoelectric cell 18 whenever there is a gap between production pieces. When a gap prevails over a light source 19, light falling on the photoelectric cell 18 is converted into an electrical potential to trip counter 14. Thus, a series of electrical pulses caused by the space between pieces will effect a count of the number of said pieces. However it is frequently impossible to provide such a space between cigarettes since they are rapidly produced at a nominal rate of 1200 every minute. In this event, the apparatus of FIGURE 2 will likewise produce a miscount as the photoelectric cell 18 will be unable to detect a small gap between pieces.

In FIG. 3 is shown a system which combines features of the two different devices used in the aforementioned FIG. 1 and FIG. 2 to provide an accurate count of pieces produced.

Referring to FIG. 3, a preferred embodiment of the invention is associated with a cigarette making machine, but it is to be appreciated that the invention may be advantageously incorporated with any of a number of systems involved in the continuous processing of various articles.

A cam 16 is mechanically geared to the axle 17 of the rotating knife 12 as indicated by the dotted line. The breaker contacts 16a of the cam switch will momentarily close once per revolution of the knife 12 thereby connecting the counter 14 to the output of an amplifier 20 through closed relay contacts 22a. Alternately, this count of production pieces could be taken by connecting cam 16 so as to drive the same from any one of several other shafts on the cigarette making machine whose rotational speeds are proportional to the production rate.

Beyond the cutter 12 there are several points available in a cigarette making machine where a gap appears between the production pieces. In the preferred embodiment a light source 19 and a photoelectric cell 18 for detecting light emanating from the source are so positioned with respect to the production pieces to cause a signal after amplification in amplifier 20 to energize relay 22 only when the repetition rate of the signal indicating gaps between the production pieces is greater than some predetermined repetition rate which is indicative of some minimum production speed. Relay contacts 22a are closed, then, to permit counter 14 to operate every time contacts 16a close, i.e., whenever a new piece is severed by the knife 12.

The amplifier and time delay arrangement operating as a pulse rate detector is a device well known in the art. For more specifice details of one type of circuit which may be employed, reference can be made to U.S. Patent No. 2,451,816 issued October 19, 1948, to G. B. Dunn, in particular to relay device 31, FIG. 1 of that patent.

The operation of the device of FIG. 3 may be summarized as follows. When the cigarette making machine 11 is in operation the cutter shaft 17 is driven in timed relation to the movement of the machine. The movement of the shaft is transmitted to cam 16, which allows contacts 16a to close each time the knife 12 slices across the path of the cigarette rod 10. Each contact closure energizes the counter 14 to advance the reading thereof by one unit, provided the moving rod 10 is present. However, if the rod is neither present nor in normal motion, the counter must be disabled.

If cut cigarettes are normally interrupting the light beam incident on the photocell detector 18, the detector 18 provides periodic pulses to amplifier 20 as a result of the gaps between the cigarettes. A flash of light will periodically impinge on the detector 18. If these pulses are delivered at a certain minimum rate, the amplifier 20 and relay 22 co-act to hold contacts 22a closed. The voltage at the amplifier output is connected to cam switch 16a. The cam switch 16a transfers a voltage pulse to counter 14 to actuate the same to record a count each time the cam 16 allows the contacts 16a to close. If the cigarette rod 10 is absent or for some other reason the cut cigarettes are not passing through the light beam at the minimum rate, the pulse repetition frequency is insufficient to permit the amplifier-relay 20—22 to hold contacts 22a closed. With the contacts 22a open, cam switch 16a receives no voltage from the amplifier output, and the counter circuit is disabled. No false count can be accumulated even though the cigarette making machine 11 and its associated cutter shaft 17 continue in motion.

In the illustrated process, the cigarettes are produced at an average rate of 1200 per minute. Moreover, it is seldom practical to run the process at speeds of a lesser rate. Accordingly, amplifier-relay 20—22 will normally be constructed to drop the contacts 22a only when the pulse repetition frequency becomes nominally less than ten per second.

It is apparent from the above description of an accurate counting system in conjunction with a sensitive detection device that it is possible to effect an accurate count of production pieces as actually delivered. Since it may be desired to record the number of product pieces which are of a certain weight or whose weights lie within a predetermined limit, a simple modification of the circuit of FIG. 3 is depicted in FIG. 4.

In FIG. 4 a conventional radiation thickness gauge 30 is connected to a delay device shown generally at 32. One type of suitable radiation thickness gauge circuit is shown in U.S. Patent No. 2,790,945 issued April 30, 1957, to H. R. Chope. The delay device 32 may take any of several configurations familiar to those skilled in the art, for example, a device such as is described in U.S. Patent No. 2,217,342 issued October 8, 1940, to Ladrach. A gate 34, which may consist of a relay such as is shown in FIG. 3, controls the admission of pulses to the counter 14 conveyed thereto from the cam switch 16a.

The gauge 30 is positioned near the cigarette rod 10 between the maker 11 and the cutter 13 to detect weight variations in the rod 10. Should the maker 11 be producing "good" cigarettes, after a suitable delay time the gauge 30 would actuate gate 34 to pass the aforesaid pulses to counter 14 to be pulsed for each cigarette produced. The amount of delay required is equivalent to the time it takes a given segment of rod 10 being measured by the gauge 30 to negotiate the remaining distance to the cutter 13. This arrangement therefore enables the counter 14 to record the quantity of only "good" cigarettes. It should be realized that the gauge 30 may be adapted to signal other gates, for example, one each for "poor" and "premium" cigarettes so that the number of cigarettes of any particular quality can be ascertained.

Although only certain specific embodiments of the invention have been shown, it is to be understood that modifications may be had without departing from the spirit and scope of the invention.

What is claimed is:

1. In a cigarette making machine having a means for periodically severing a predetermined length from a cigarette rod continuously formed by said machine, an apparatus comprising, in combination, a counter having an actuator means to change the state of the count registered therein by one each time said last mentioned means is actuated; detector means emitting a voltage pulse in accordance with a gap between adjacent lengths of said periodically severed rod; an amplifier connected to said detector means for amplifying said voltage pulses; circuit means forming a low impedance path to deliver said voltage pulses to said actuator means to operate said counter; relay means having movable contacts serially connected in said circuit means intermediate said amplifier and said actuator means, said relay operable to close said movable contacts when said voltage pulse rate exceeds a predetermined minimum value; and second movable contacts operable by said machine and connected in series circuit relationship with said first movable contacts and said amplifier, said second movable contacts closing each time a cigarette is severed from said rod, said counter registering a count on closure of said first and second movable contacts.

2. In a cigarette making machine having a means for periodically severing a predetermined length from a cigarette rod continuously formed by said machine, an apparatus comprising, in combination, a counter having an actuator means to change the state of the count registered therein by one each time said last mentioned means is actuated; detector means emitting a voltage pulse in accordance with a gap between adjacent lengths of said periodically severed rod; an amplifier connected to said detector means for amplifying said voltage pulses; circuit means forming a low impedance path to deliver said voltage pulses to said actuator means to operate said counter; relay means having movable contacts serially connected in said circuit means intermediate said amplifier and said actuator means, said relay operable to close said movable contacts when said voltage pulse rate exceeds a predetermined minimum value; a cam rotatably driven by said severing means; and second movable contacts connected in series circuit relationship with said first movable contacts and also intermediate said amplifier and said counter, said cam cyclically closing said second movable contacts each time a cigarette is severed from said rod, said counter registering one count whenever said first and second movable contacts are closed.

References Cited in the file of this patent

UNITED STATES PATENTS

| 1,393,525 | Grupe | Oct. 11, 1921 |
| 2,438,365 | Hepp et al. | Mar. 23, 1948 |
| 2,809,297 | Hartwig et al. | Oct. 8, 1957 |

FOREIGN PATENTS

| 296,293 | Germany | Jan. 30, 1917 |